UNITED STATES PATENT OFFICE.

WILLIAM W. PETTENGILL, OF GEORGIA, ASSIGNOR TO ENOCH B. WHITING, OF ST. ALBANS, VERMONT.

IMPROVEMENT IN MEDICAL COMPOUNDS.

Specification forming part of Letters Patent No. 131,778, dated October 1, 1872; antedated September 28, 1872.

*To all whom it may concern:*

Be it known that I, WILLIAM W. PETTENGILL, of Georgia, in the county of Franklin and State of Vermont, have invented a new and valuable composition of matter to be used as a remedial agent in the treatment of piles and diseases of the kidneys, of which the following is a specification:

The nature of my invention consists in chemically changing the constituent parts of the common white or other variety of beans by the application of heat, thereby developing a new and hitherto unknown remedial agent, which will readily combine, under the process hereinafter described, with known medicines of commerce, by which the system of the diseased patient is prepared for its reception, and by which also it is carried to the seat of disease, to be used in the treatment of the diseases aforesaid, and such other diseases of kindred nature as the same will favorably act upon.

To prepare the beans for the combination aforesaid, take the common white or other variety and subject them to a heat in an oven or other receptacle sufficient to parch them to a dark brown color. Take of the beans so parched fifteen (15) ounces and grind the same to that degree of fineness to which coffee is ground for use; then add one-half ounce of pulverized senna, and one ounce of pulverized sweet-fern. Take one ounce of the mixture and steep it in one pint of water, as required for use, and the water so medicated by the said mixture can be beneficially used in the treatment of piles, diseases of the kidneys, and diseases of a kindred nature.

The senna and the sweet-fern are not essentially necessary as being the only ingredients which will properly combine in the composition of this remedy; but any of the other medicines of commerce, acting similarly upon the human system, may be used in such proportions as their respective qualities and natures may require.

I am aware that parched beans have been used for the adulteration of coffee. I therefore disclaim their use for this purpose.

What I do claim as my invention, and desire to secure by Letters Patent, is—

A medical compound consisting of the extract of the common or other variety of bean, obtained as described, in combination with senna and sweet-fern or their equivalent, substantially as and for the purposes set forth.

WM. W. PETTENGILL.

Witnesses:
MASON B. CARPENTER,
MYRON W. BAILEY.